(12) United States Patent
Kim et al.

(10) Patent No.: US 6,805,649 B2
(45) Date of Patent: Oct. 19, 2004

(54) HYDRAULIC CONTROL SYSTEM FOR AUTOMATIC TRANSMISSION

(75) Inventors: Tae-Kyun Kim, Hwaseong (KR); Byung-Kwan Shin, Yongin (KR)

(73) Assignee: Hyundai Motor Company, Seoul (KR)

( * ) Notice: Subject to any disclaimer, the term of this patent is extended or adjusted under 35 U.S.C. 154(b) by 51 days.

(21) Appl. No.: 10/224,069

(22) Filed: Aug. 19, 2002

(65) Prior Publication Data

US 2003/0040389 A1 Feb. 27, 2003

(30) Foreign Application Priority Data

Aug. 21, 2001 (KR) .................................... 2001-0050292

(51) Int. Cl.$^7$ .............................................. F16H 31/00
(52) U.S. Cl. ........................ 475/128; 475/119; 475/131
(58) Field of Search ................................ 475/128, 118, 475/119, 120, 121, 122, 131, 132, 133

(56) References Cited

U.S. PATENT DOCUMENTS

| | | | | |
|---|---|---|---|---|
| 5,569,116 A | * | 10/1996 | Jang ............................ | 477/130 |
| 5,626,533 A | * | 5/1997 | Jang ............................ | 475/129 |
| 5,634,865 A | * | 6/1997 | Jang ............................ | 475/128 |
| 6,319,165 B1 | * | 11/2001 | Itou et al. .................... | 475/119 |
| 6,350,214 B1 | * | 2/2002 | Murasugi ..................... | 475/128 |
| 6,361,465 B1 | * | 3/2002 | Hirose ........................ | 475/128 |
| 6,464,611 B2 | * | 10/2002 | Futamura et al. ........... | 475/128 |

* cited by examiner

*Primary Examiner*—Tisha D Lewis
(74) *Attorney, Agent, or Firm*—Morgan Lewis & Bockius LLP

(57) ABSTRACT

A hydraulic control system, in which a powertrain of a 5-speed automatic transmission is controlled using five clutches and three brakes such that fuel consumption is reduced and engine torque is more efficiently utilized. The hydraulic control system includes four pressure control valves, three switching valves, and three fail-safe valves that are controlled by solenoid valves.

19 Claims, 13 Drawing Sheets

FIG.2

|   |   | CLUTCH | | | | | BRAKE | | | F1 | F2 | F3 |
|---|---|---|---|---|---|---|---|---|---|---|---|---|
|   |   | C1 | C2 | C3 | C4 | C5 | B1 | B2 | B3 | F1 | F2 | F3 |
| N |   |   |   |   |   |   |   |   |   |   |   |   |
| D | 1 | ○ |   |   |   |   | ○ |   | ○ | ○ |   |   |
|   | 2 | ○ |   |   | ○ |   |   | ○ | ○ |   | ○ | ○ |
|   | 3 | ○ | ○ |   | ○ |   |   |   | ○ |   | ○ | ○ |
|   | 4 | ○ | ○ |   | ○ |   |   | ○ |   |   | ○ |   |
|   | 5 | ○ | ○ |   | ○ | ○ |   |   |   |   |   |   |
| L |   | ○ |   |   | ○ | ○ | ○ |   | ○ | ○ | ○ | ○ |
| R |   |   |   | ○ |   |   | ○ |   | ○ |   |   |   |

FIG.6

|   |   | S1 | S2 | S3 | S4 | S5 | S6 |
|---|---|---|---|---|---|---|---|
| N |   | OFF | ON | ON | OFF | OFF | OFF |
| D | 1 | ON | ON | OFF | OFF | OFF | OFF |
|   | 2 | ON | OFF | OFF | OFF | ON | ON |
|   | 3 | OFF | OFF | OFF | OFF | ON | ON |
|   | 4 | OFF | OFF | OFF | ON | ON | ON |
|   | 5 | OFF | OFF | ON | ON | ON | ON |
| L |   | OFF | ON | OFF | OFF | OFF | OFF |
| R |   | OFF | OFF | OFF | OFF | OFF | OFF |

HYDRAULIC CONTROL SYSTEM FOR AUTOMATIC TRANSMISSION

FIELD OF THE INVENTION

The present invention relates to a hydraulic control system for an automatic transmission. More particularly, the present invention relates to a hydraulic control system for an automatic transmission in which the hydraulic control system is capable of operating a powertrain having five forward speeds.

BACKGROUND OF THE INVENTION

An automatic transmission for vehicles generally includes a torque converter; a powertrain, which is a multi-stage gearshift mechanism connected to the torque converter; and a hydraulic control system for selecting one of a plurality of operational elements of the powertrain depending on driving and load conditions.

Among these main elements of the automatic transmission, the hydraulic control system, which concerns the present invention, includes a pressure regulator for regulating hydraulic pressure generated by the operation of a hydraulic pump, a manual and automatic shift controller for forming a shift mode, a hydraulic pressure controller for regulating shift feel and responsiveness to form a smooth shift mode during shifting, a damper clutch controller for controlling operation of a damper clutch in the torque converter, and a line converter for varying the flow of hydraulic pressure through a plurality of lines such that a suitable hydraulic pressure is supplied to each friction element.

In the automatic transmission with the above elements, hydraulic pressure is varied and line conversion is performed by solenoid valves that are ON/OFF-controlled and solenoid valves that are duty-controlled by the hydraulic control system such that hydraulic pressure is supplied to the correct friction element(s) to realize shifting into the desired shift speed.

Although the powertrain and hydraulic control system are configured and developed differently depending on the manufacturer, the 4-speed automatic transmission is the most common type of automatic transmission used by automakers.

However, the limited number of speeds of the 4-speed automatic transmission (compared to, for example, a 5-speed transmission) is such that there is a significant dissimilarity in gear ratios between the different speeds. This increases fuel consumption. Further, with the increasing emphasis on performance and drivability, such a difference in gear ratios and the limited number of speeds make the 4-speed automatic transmission an unattractive alternative to the 5-speed automatic transmission.

SUMMARY OF THE INVENTION

The present invention provides a hydraulic control system for better control of a powertrain in a 5-speed automatic transmission. In preferred embodiments, the system is adapted to control a transmission including five clutches and three brakes to minimize fuel consumption and more efficiently use engine torque. In one embodiment, a manual valve is indexed with a driver-operated shift selector to undergo port conversion. A first pressure control valve is controlled by control pressure of a first solenoid valve. The first pressure control valve preferably supplies N range pressure from the manual valve selectively to a fifth clutch in fourth and fifth speeds, and to a first brake in the neutral N range and the low L range. A second pressure control valve is controlled by control pressure of a second solenoid valve. The second pressure control valve supplies D range pressure from the manual valve selectively to a second brake in the second speed and the fifth speed; and, simultaneously, as control pressure of a first fail-safe valve. A third pressure control valve is controlled by control pressure of a third solenoid valve. The third pressure control valve supplies D range pressure from the manual valve to a first clutch in the first speed, and to a fourth clutch in the low L range and in second, third, and fourth speeds. A fourth pressure control valve is controlled by control pressure of a fourth solenoid valve. The fourth pressure control valve supplies line pressure as control pressure for a third brake and the third solenoid valve in first, second, and third speeds, and in the reverse R range and the neutral N range.

A number of switching valves are also preferably provided. A first switching valve switches hydraulic ports (i.e., port conversion) to selectively supply D range pressure, first pressure control valve pressure, and line pressure to the first clutch and to the fourth clutch. The fourth clutch operates in the first, second, third, and fourth speeds and in the reverse R and low L ranges. A second switching valve, controlled by L range pressure, D range pressure, and control pressure of the fifth solenoid valve, selectively supplies hydraulic pressure to the first pressure control valve to a second clutch and the first brake, which operate in the third, fourth, and fifth speeds. A fifth solenoid valve controls pressure from a reducing valve to selectively supply the pressure as control pressure to the first and second switching valves. A third switching valve, controlled by line pressure and second clutch pressure, selectively supplies hydraulic pressure supplied from the second switching valve to the second clutch and the fifth clutch. A N-R control valve, controlled by control pressure of the second solenoid valve, supplies R range pressure from the manual valve to a third clutch in the reverse R range.

The first fail-safe valve is controlled by line pressure, second brake pressure, and second clutch pressure, and selectively supplies hydraulic pressure from the manual valve and the second switching valve to the first brake. The first fail-safe valve prevents simultaneous engagement of the first and second brakes, and prevents forward driving by engagement of the first brake and the second clutch when in the neutral N range. A second fail-safe valve is controlled by R range pressure, second and fourth clutch pressure, and N range pressure. The second fail-safe valve prevents simultaneous engagement of the second brake and the first, second, and fourth clutches, and selectively supplies hydraulic pressure from the second pressure control valve to the second brake. A third fail-safe valve is controlled by D range pressure and third brake pressure, and selectively supplies hydraulic pressure from the third switching valve to the fifth clutch. The third fail-safe valve prevents the simultaneous operation of the third brake and the fifth clutch.

BRIEF DESCRIPTION OF THE DRAWINGS

The accompanying drawings, which are incorporated in and constitute a part of the specification, illustrate an embodiment of the invention, and, together with the description, serve to explain the principles of the invention.

FIG. 2 is a chart illustrating engaged and disengaged states of friction elements of the powertrain of FIG. 1;

FIG. 6 is a chart illustrating ON and OFF states of solenoid valves in the hydraulic control system of FIG. 3;

DETAILED DESCRIPTION OF THE PREFERRED EMBODIMENTS

Preferred embodiments of the present invention will now be described in detail with reference to the accompanying drawings.

Figure 1:
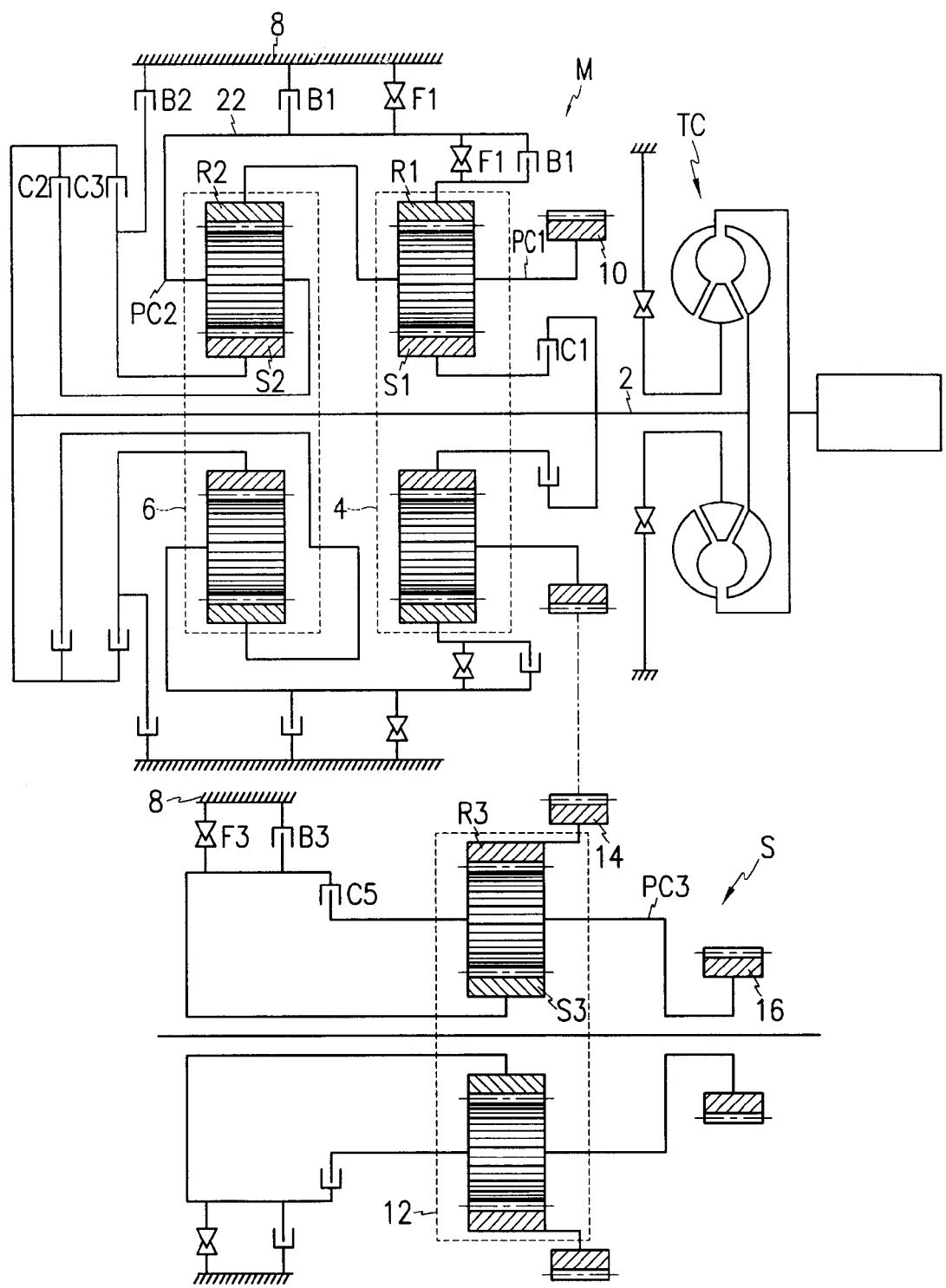
FIG. 1 is a schematic view of a powertrain employing a control system according to the present invention.

Referring to FIG. 1, the powertrain includes a main shift assembly M and a secondary shift assembly S. The main shift assembly M includes four operational elements within the combination of first and second single pinion planetary gearsets 4 and 6, and shifting is realized by the complementary operation of these operational elements.

To aid in the description that follows, a sun gear, a planet carrier, and a ring gear of the first single pinion planetary gearset 4 will be referred to as a first sun gear S1, a first planet carrier PC1, and a first ring gear R1, respectively. The sun gear, planet carrier, and ring gear of the second single pinion planetary gearset 6 will be referred to as a second sun gear S2, a second planet carrier PC2, and a second ring gear R2.

With respect to the combination of the first and second single pinion planetary gearsets 4 and 6, the first planet carrier PC1 is fixedly connected to the second ring gear R2 to act as an output element, and the first ring gear R1 is variably connected to the second planet carrier PC2.

The first sun gear S1 is connected to an input shaft 2 through a first clutch C1 to realize input in first, second, third, fourth, and fifth speeds of a drive D range. The second planet carrier PC2 is variably connected to the input shaft through a second clutch C2 to operate as an input element in the third, fourth, and fifth speeds. Second planet carrier PC2 is also variably connected to a transmission housing 8 through a first brake B1, which operates in the reverse R range, the neutral N range, and the low L range, and through a first one-way clutch F1, which operates in the first speed and the low L range, to operate as a fixed element in the reverse R range, neutral N range, and low L range.

Further, the second sun gear S2 is connected to the input shaft 2 through a third clutch C3 to operate as an input element in the reverse R range. Second sun gear S2 is variably connected to the transmission housing 8 through a second brake B2 to operate as a fixed element in the second and fifth speeds of the drive D range.

The variable connection between the second planet carrier PC2 and the first ring gear R1 is realized through a fourth clutch C4 and a second one-way clutch F2, which are provided in parallel. The fourth clutch C4 and the second one-way clutch F2 are mounted toward the first ring gear R1, and function only to interconnect the second planet carrier PC2 and the first ring gear R1. The first brake B1 and the first one-way clutch F1 operate, when acting without other elements, to control the second planet carrier PC2. However, when the fourth clutch C4 and the second one-way clutch F2 are engaged, the first brake B1 and the first one-way clutch F1 also control the first ring gear R1.

Acting as output elements, the first planet carrier PC1 and the second ring gear R2 are mechanically connected to the input element of the secondary shift assembly S through a transfer gear 10. The secondary shift assembly S is realized through a third single pinion planetary gearset 12. Again, to aid in the following description, the sun gear, planet carrier, and ring gear of the third single pinion planetary gearset 12 will be referred to as a third sun gear S3, a third planet carrier PC3, and a third ring gear R3, respectively.

The third ring gear R3 acts as an input element and receives drive power of the main shift assembly M through a driven gear 14. The third sun gear S3 is connected to the third planet carrier PC3 with a fifth clutch C5, which operates in the fourth and fifth speeds, interposed therebetween. The third sun gear S3 is also variably connected to the transmission housing 8. This variable connection to the transmission housing 8 is realized through a third brake B3, which operates in the first, second, and third speeds and in the neutral N, low L, and reverse R ranges, and through a third one-way clutch F3, which operates in the first, second, and third speeds, and in the low L range.

The third planet carrier PC3 acts as an output element, and a drive gear 16 connected to the third planet carrier PC3 is connected to a differential (not shown). The output element of the main shift assembly M and the input element of the secondary shift assembly S are linked through gears, a chain, etc.

Figure 3:
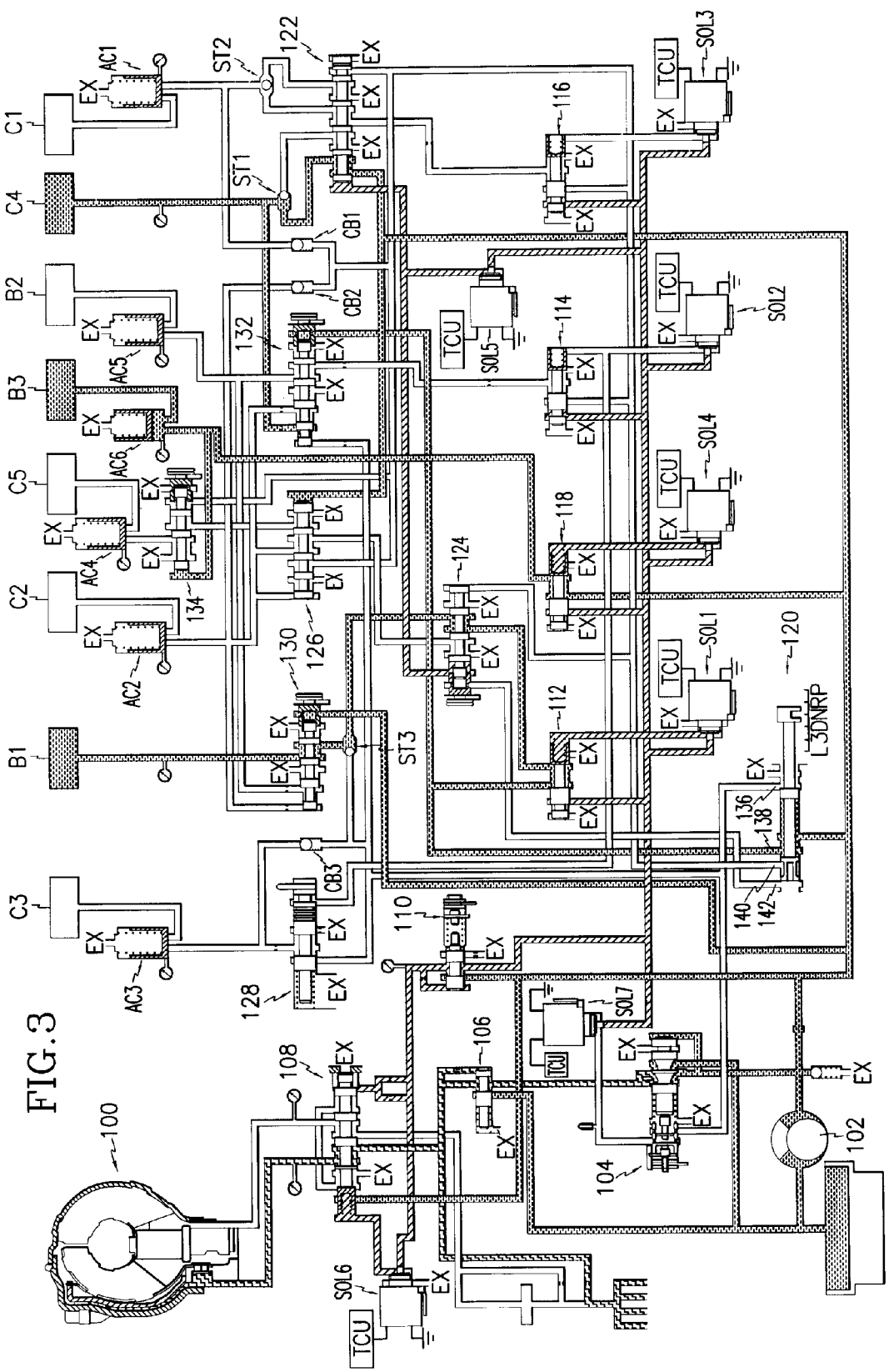
FIG. 3 is a hydraulic circuit diagram of a hydraulic control system according to a preferred embodiment of the present invention, illustrating the flow of hydraulic pressure in a neutral N range.

In a powertrain structured as in the above, clutches C1, C2, C3, C4, and C5, brakes B1, B2, and B3, and the one-way clutches F1, F2, and F3 are engaged and disengaged as shown in the chart of FIG. 2 to realize shifting into the different speeds and ranges. A hydraulic control system as shown in FIG. 3 is used to operate these friction elements.

The hydraulic control system includes a torque converter 100 that receives torque from the engine, performs conversion of the torque, then transmits the torque to the transmission. A hydraulic pump 102 operates to generate hydraulic pressure used for the torque converter 100 and for shifting control, and to provide oil for lubrication. The hydraulic pressure generated by operation of the hydraulic pump 102 is supplied to a line pressure regulator/damper clutch controller, a pressure reducing unit, an input controller, and a fail-safe/line converting unit.

The line pressure regulator/damper clutch controller includes a regulator 104 for controlling the hydraulic pressure supplied from the hydraulic pump 102 to a predetermined level of hydraulic pressure. A torque converter control valve 106 controls the hydraulic pressure supplied from the regulator 104 to a predetermined level of hydraulic pressure for supply to the torque converter 100 and for lubrication. A damper clutch control valve 108 controls a damper clutch to increase power transmission efficiency of the torque converter 100.

The pressure reducing unit includes a reducing valve 110 that maintains a level of pressure that is always lower than line pressure. Part of the pressure reduced through the reducing valve 110 is supplied as control pressure of the damper clutch control valve 108, and part as control pressure of a solenoid valve SOL7, which controls the regulator valve 104 to adjust line pressure. Further, part of the reduced pressure is supplied to a hydraulic pressure controller, which is realized through first, second, third, and fourth pressure control valves 112, 114, 116, and 118 that form a hydraulic pressure that may be used as shift control pressure. Another part of the reduced pressure is supplied to first, second, third, and fourth solenoid valves SOL1, SOL2, SOL3, and SOL4, which control the first, second, third, and fourth pressure control valves 112, 114, 116, and 118, respectively. Finally, reduced pressure fluid also flows to a fifth solenoid valve SOL5 for controlling a switching valve of the line converter.

A manual valve 120, which is indexed with a driver-operated shift selector to realize port conversion, supplies hydraulic pressure according to the range selected by the driver. This hydraulic pressure is either first controlled by the hydraulic pressure controller then supplied to first, second, and third switching valves 122, 124, and 126, or supplied directly to the first, second, and third switching valves. The hydraulic pressure is also either first controlled by the hydraulic pressure controller then supplied to an N-R control valve 128, and first, second, and third fail-safe valves 130, 132, and 134, or is supplied directly to these elements.

Figure 4:
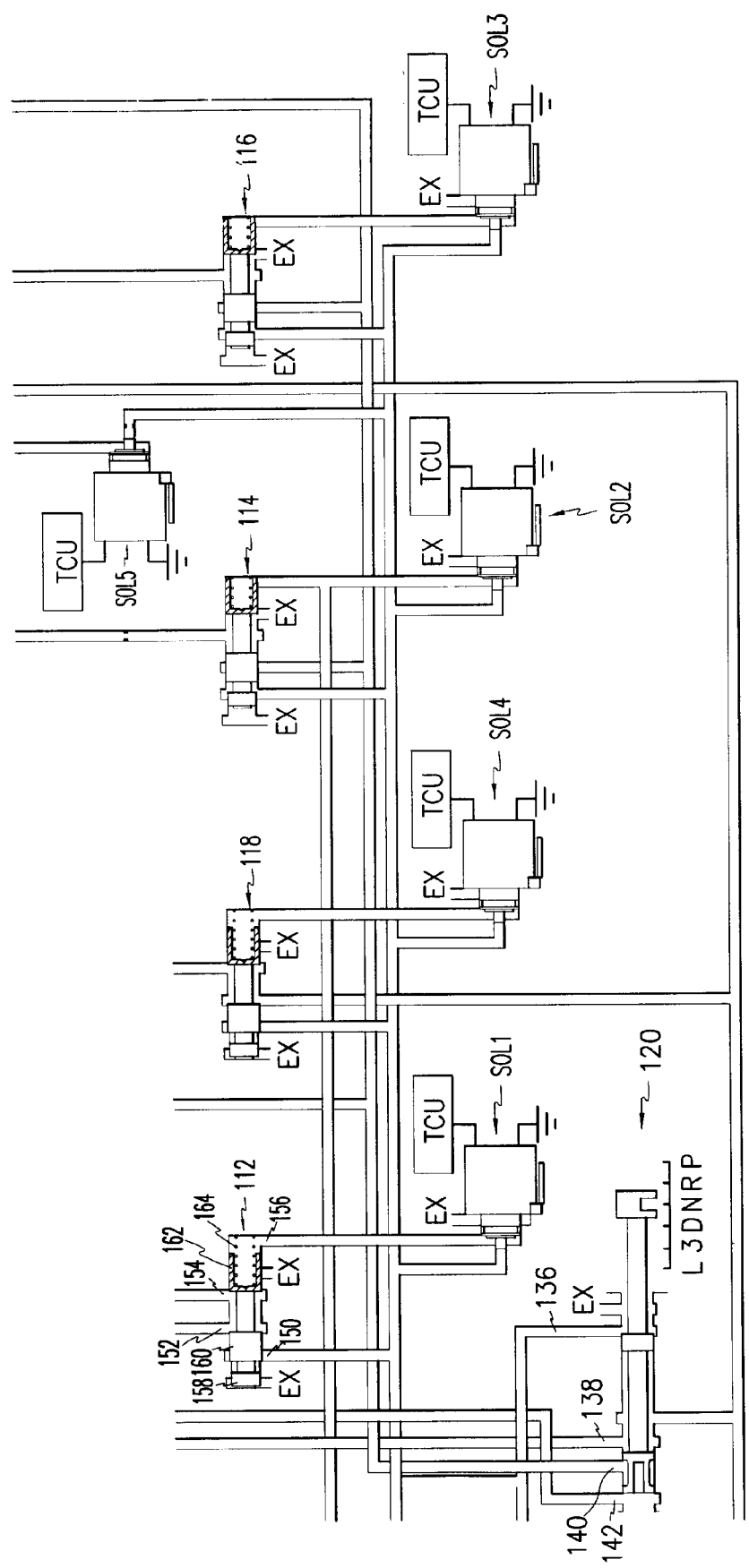
FIG. 4 is a partial hydraulic circuit diagram of the hydraulic control system of FIG. 3, used to show a manual valve and elements connected thereto in more detail.

With reference to FIG. 4, the manual valve 120 is connected to an R range pressure line 136, an N range pressure line 138, a D range pressure line 140, and an L range pressure line 142. The manual valve 120 supplies hydraulic pressure from the hydraulic pump 102 through these lines according to the positioning of the manual valve 120 by the driver, thereby realizing shifting. The R-range pressure line 136 is connected to the regulator valve 104, the N-R control valve 128, and the second fail-safe valve 132. The N range pressure line 138 is connected to the first pressure control valve 112 and the second fail-safe valve 132. The D range pressure line 140 is connected to the second and third pressure control valves 114 and 116, and to the first and second switching valves 122 and 124. The L range pressure line 142 is connected to the second switching valve 124.

The structure of the first pressure control valve 112 and the first solenoid valve SOL1, which are part of the hydraulic pressure controller, will now be described with reference to FIG. 4. The valve body of the first pressure control valve 112 includes a number of ports. A first port 150 receives reduced hydraulic pressure from the reducing valve 110. A second port 152 receives hydraulic pressure from the manual valve 120. A third port 154 supplies the hydraulic pressure supplied to the second port 152 to the second switching valve 124. A fourth port 156 for receiving control pressure from the first solenoid valve SOL1. The first solenoid valve receives control pressure from the reducing valve 110.

A valve spool, slidably provided within the valve body of the first pressure control valve 112, includes a number of lands. The first land 158, on which the hydraulic pressure supplied to the first port 150 acts, has a relatively small diameter. The second land 160, on which the hydraulic pressure supplied through the first port 150 acts, selectively opens and closes the second port 152. The third land 162, on which the control pressure supplied to the fourth port 156 acts, provides selective communication between the second and third ports 152 and 154. The third land 162 functions together with the second land 160. An elastic member 164 is interposed between the third land 162 and the valve body to provide a constant biasing force to the valve spool in a leftward direction (in the drawing).

The first solenoid valve SOL1, which controls the first pressure control valve 112, is preferably a 3-way valve. If the first solenoid valve SOL1 is controlled to ON, in a state where the reduced hydraulic pressure is cut off, the hydraulic pressure supplied as control pressure to the first pressure control valve 112 is exhausted. If the first solenoid valve SOL1 is controlled to OFF, its exhaust port is closed and the reduced hydraulic pressure is supplied to the first pressure control valve 112. Since a structure allowing this operation is identical to the structure found in conventional hydraulic control systems, a detailed description will not be provided.

With this structure, when the first solenoid valve SOL1 is controlled to ON, the valve spool of the first pressure control valve 112 is biased to the right (in the drawing) such that the second port 152 is closed. On the other hand, when the first solenoid valve SOL1 is controlled to OFF, control pressure is supplied to the first pressure control valve 112 such that the valve spool of the same is biased to the left. As a result, the second port 152 communicates with the third port 154 to thereby supply hydraulic pressure to the second switching valve 124. The second switching valve 124 accordingly supplies hydraulic pressure from the first pressure control valve 112 either to one of the second clutch C2 and the fifth clutch C5 through the third switching valve 126, or to the first brake B1 through the first fail-safe valve 130.

The second, third, and fourth pressure control valves 114, 116, and 118 are structured identically as the first pressure control valve 112. However, their connection to other elements in the hydraulic control system is different. That is, the second pressure control valve 114 is connected to the second brake B2 and the first fail-safe valve 130 through the second fail-safe valve 132, the third pressure control valve 116 is selectively connected to the first clutch C1 and the fourth clutch C4 through the first switching valve 122, and the fourth pressure control valve 118 is connected to the third fail-safe valve 134 and directly to the third brake B3.

The first switching valve 122 that forms the fail-safe/line converting unit performs line conversion for the supply of hydraulic pressure to the first clutch C1 and the fourth clutch C4. Since the first clutch C1 is a friction element that operates only in the drive D range, the first switching valve 122 operates to supply D range pressure to the first clutch C1, and since the fourth clutch C4 is a friction element that operates in all ranges, the first switching valve 122 supplies line pressure to the fourth clutch C4 such that tie-up, which can occur between the ranges, is prevented.

Further, the first switching valve 122 connects a control line to the fourth clutch C4 in the second, third, and fourth speeds of the drive D range to provide for power OFF and manual shifting. First switching valve 122 also connects a control line to the first clutch C1 in the park P range, reverse R range, neutral N range, low L range, and the first speed of the drive D range to prevent valve sticking and to enable N→D shifting.

Figure 5:
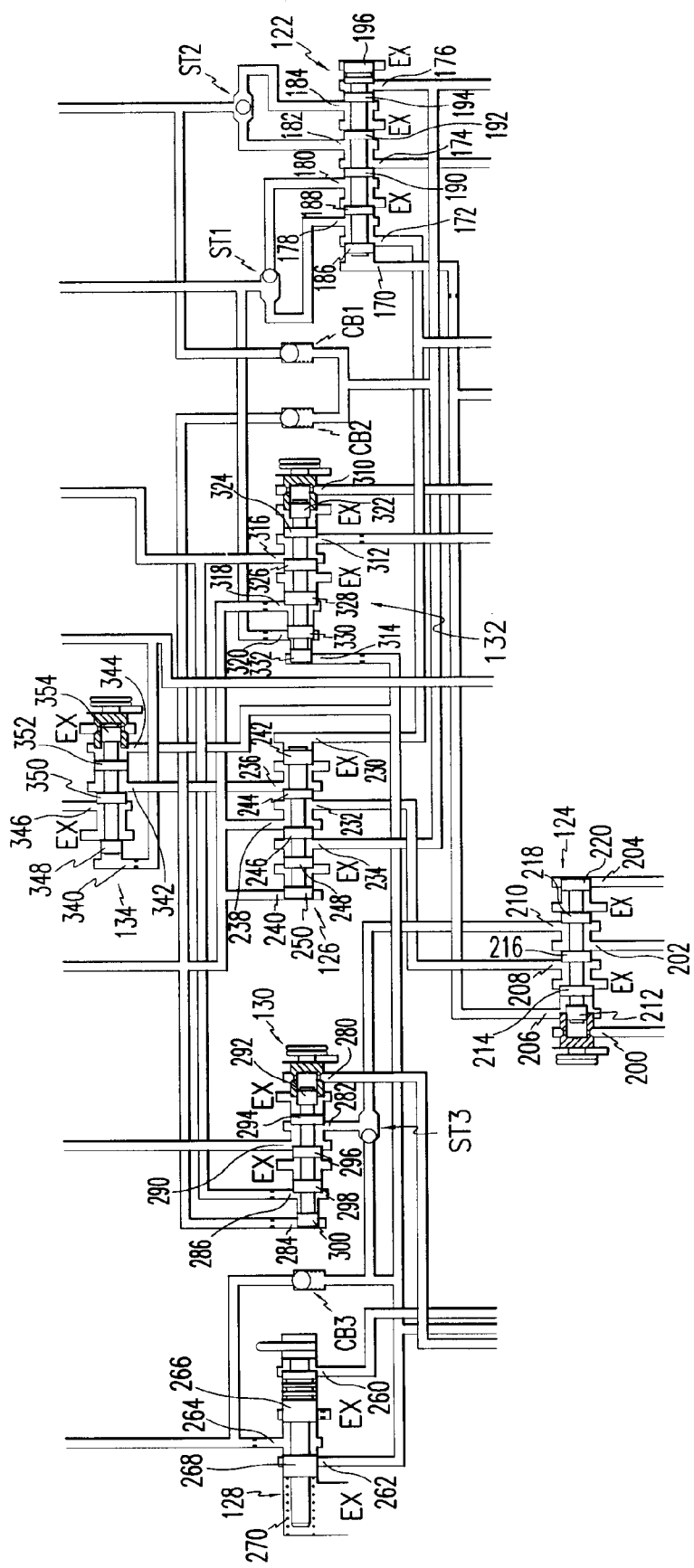
FIG. 5 is a partial hydraulic circuit diagram of the hydraulic control system of FIG. 3, used to show a fail-safe valve, a line converter, and elements connected thereto in more detail.

The valve body of the first switching valve 122, with reference to FIG. 5, preferably includes at least eight ports. A first port 170 receives control pressure from the fifth solenoid valve SOL5. A second port 172 receives line pressure. A third port 174 receives hydraulic pressure from the second pressure control valve 116. A fourth port 176 receives D range pressure from the manual valve 120. A fifth port 178 supplies the hydraulic pressure supplied to the second port 172 to the fourth clutch C4. A sixth port 180 supplies the hydraulic pressure supplied to the third port 174 to the fourth clutch C4. A seventh port 182 supplies the hydraulic pressure supplied to the third port 174 to the first clutch C1. An eighth port 184 supplies the hydraulic pressure supplied to the fourth port 176 to the first clutch C1.

Lines leading from the fifth and sixth ports 178 and 180 of the first switching valve 122 converge at a first shuttle valve ST1 and are connected to the fourth clutch C4. Also, lines leading from the seventh and eighth ports 182 and 184 of the first switching valve 122 converge at a second shuttle valve ST2 and are connected to the first clutch C1. In addition, the second shuttle valve ST2 is communicated with the fourth port 176 through a bypass line. A first check valve CB1 for preventing the reverse flow of hydraulic pressure is mounted on the bypass line.

A valve spool slidably provided within the valve body of the first switching valve 122 preferably includes at least six lands. A first land 186 is acted on by the hydraulic pressure supplied through the first port 170. A second land 188 provides selective communication between the second port 172 and the fifth port 178. A third land 190 provides selective communication between the third port 174 and the sixth port 180. A fourth land 192 provides selective communication between the third port 174 and the seventh port 182. A fifth land 194 provides selective communication between the fourth port 176 and the eighth port 184. A sixth land 196 that is acted on by the hydraulic pressure supplied through the fourth port 176.

The second switching valve 124 performs line conversion for the supply of hydraulic pressure to the second clutch C2 and the first brake B1. When L range pressure generated by the operation of the manual valve 120 and control pressure generated by the operation of the fifth solenoid valve SOL5 enter the second switching valve 124 simultaneously, line conversion is performed such that hydraulic pressure supplied from the first pressure control valve 112 is supplied to the first brake B1. Also, when control pressure is not supplied from the fifth solenoid valve SOL5, port conversion does not occur even with the supply of L range pressure, and after the second clutch C2 is disengaged, the ON/OFF timing of the second switching valve 124 may be freely determined such that a sufficient control time may be obtained during control of the supply of hydraulic pressure to the first brake B1.

If a state occurs where solenoid power is cut off, the hydraulic pressure enters the second clutch C2 to effect shifting into the third speed, and in the park P, reverse R, neutral N, and low L ranges. Line conversion is thus performed by the second switching valve 124 to supply hydraulic pressure to the first brake B1.

A valve body of the second switching valve 124, with reference to FIG. 5, preferably includes at least six ports. A first port 200 is connected to the L range pressure line 142. A second port 202 is connected to the first pressure control valve 112. A third port 204 is connected to the D range pressure line 140. A fourth port 206 is connected to the fifth solenoid valve SOL5. A fifth port 208 supplies the hydraulic pressure supplied to the second port 202 to the third switching valve 126. A sixth port 210 supplies the hydraulic pressure supplied to the second port 202 to the first brake B1 through the first fail-safe valve 130.

A valve spool slidably provided within the valve body of the second switching valve 124 preferably includes at least five lands as follows. A first land 212 is acted on by hydraulic pressure supplied to the first port 200. A second land 214 is acted on by hydraulic pressure supplied to the fourth port 206. A third land 216 provides selective communication between the second port 202 and the fifth port 208. A fourth land 218 provides selective communication between the second port 202 and the sixth port 210. A fifth land 220 is acted on by hydraulic pressure supplied to the third port 204.

The third switching valve 126 is controlled by line pressure to control hydraulic pressure supplied to the second clutch C2 and the fifth clutch C5. A valve body of the third switching valve 126, with reference to FIG. 5, preferably includes at least six ports as described below. A first port 230 supplies line pressure. A second port 232 is connected to the second switching valve 124. A third port 234 is connected to the D range pressure line 140. A fourth port 236 supplies the hydraulic pressure supplied to the second port 232 to the fifth clutch C5 through the third fail-safe valve 134. A fifth port 238 selectively supplies the hydraulic pressure supplied to the second and third ports 232 and 234 to the second clutch C2. A sixth port 240 receives part of the hydraulic pressure supplied to the second clutch C2. Further, the fifth port 238 is connected to the third port 234 through a bypass line, and a second check valve CB2 is provided on the bypass line to prevent the reverse flow of hydraulic pressure.

A valve spool slidably provided within the valve body of the third switching valve 126 preferably includes at least five lands. A first land 242 is acted on by the hydraulic pressure supplied to the first port 230. A second land 244 provides selective communication between the second port 232 and the fourth port 236. A third land 246 provides selective communication between the second and third ports 232 and 234 and the fifth port 238. A fourth land 248 provides selective communication between the third port 234 and the fifth port 238 by acting in cooperation with the third land 246. A fifth land 250 is acted on by the hydraulic pressure supplied through the sixth port 240.

The N-R control valve 128 is controlled by a control pressure of the fifth solenoid valve SOL5. A valve body of the N-R control valve 128, with reference to FIG. 5, preferably includes a first port 260 connected to the fifth solenoid valve SOL5, a second port 262 for receiving R range pressure, and a third port 264 for supplying hydraulic pressure supplied to the second port 262 to the third clutch C3. In addition, the third port 264 communicates with the second port 262 through a bypass line. A third check valve CB3 is provided on the bypass line to prevent the reverse flow of hydraulic pressure.

A valve spool slidably provided within the valve body of the N-R control valve 128 preferably includes a first land 266 on which the hydraulic pressure supplied to the first port 260 acts, and a second land 268 for selectively opening and closing the second port 262. Also, an elastic member 270 is interposed between the second land 268 and the valve body to provide a constant biasing force to the valve spool in a rightward direction (in the drawing).

The first fail-safe valve 132 prevents the simultaneous engagement of the first and second brakes B1 and B2, and prevents forward driving by the engagement of the first brake B1 and the second clutch C2 when in the neutral N range. That is, if a hydraulic pressure is instantaneously supplied simultaneously to the second clutch C2, the first brake B1, and the second brake B2, the first fail-safe valve 132 exhausts the pressure from the first brake B1. When failed, that is, when a hydraulic pressure is instantaneously supplied simultaneously to C2, B1, and B2, if the first brake B1 is maintained in an engaged state while the second brake B2 is disengaged, shifting into the low L range is effected such that shock caused by the application of a large engine brake occurs. To prevent this, the second brake B2 is maintained engaged and the first brake is disengaged.

A valve body of the first fail-safe valve 130, with reference to FIG. 5, preferably includes at least five ports. A first port 280 receives line pressure. A second port 282 receives pressure from the second switching valve 124 or receives an R range pressure. A third port 284 receives control pressure from the second switching valve 126. A fourth port 286 receives part of the hydraulic pressure supplied to the second brake B2. A fifth port 290 supplies the hydraulic pressured supplied to the second port 282 to the first brake B1.

A valve spool provided within the valve body of the first fail-safe valve 130 preferably includes at least five lands. A first land 292 is acted on by the hydraulic pressure supplied to the first port 280. Second and third lands 294 and 296 provide selective communication between the second port 282 and the fifth port 290. A fourth land 298 is acted on by the hydraulic pressure supplied to the fourth port 286. A fifth land 300 is acted on by the hydraulic pressure supplied to the third port 284. In addition, a third shuttle valve ST3 is provided on a line connected to the second port 282 such that the first fail-safe valve 130 selectively receives hydraulic pressure from the second switching valve 124 and the R range pressure line 136.

The second fail-safe valve 132 prevents the simultaneous engagement of the first, second, and fourth clutches C1, C2, and C4, and the second brake B2. However, since the first clutch C1 is always engaged when driving the vehicle, pressures of the second clutch C2, the fourth clutch C4, and the second brake B2 are used as fail detection pressures. If the first clutch C1, the second clutch C2, and the second brake B2 are engaged, shifting into the fourth speed is realized, and the powertrain variably operates. If the fourth clutch C4 operates at this time, tie-up occurs.

In this case, the second fail-safe valve 132 disengages the second brake B2 and accordingly the shift speed is shifted into the third speed. In this case, the first, second, and fourth clutches C1, C2, and C4 are mechanically engaged. In addition, in order to prevent sticking of the second fail-safe valve 132 because of biased initial position of its valve spool, R range pressure is supplied to an end of the valve spool in the reverse R range.

A valve body of the second fail-safe valve 132, with reference to FIG. 5, preferably includes at least six ports. A first port 310 receives line pressure. A second port 312 receives hydraulic pressure from the second pressure control valve 114. A third port 314 receives R range pressure. A fourth port 316 supplies the hydraulic pressure supplied to the second port 312 to the second brake B2. A fifth port 318 receives part of the hydraulic pressure supplied to the second clutch C2. A sixth port 320 receives the hydraulic pressure supplied to the fourth clutch C4.

A valve spool slidably provided within the valve body of the second fail-safe valve 132 preferably includes at least six lands. A first land 322 is acted on by the hydraulic pressure supplied to the first port 310. Second and third lands 324 and 326 selectively supply the hydraulic pressure supplied to the second port 312 to the fourth port 316. A fourth land 328 is acted on by the hydraulic pressure supplied to the fifth port 318. A fifth land 330 is acted on by the hydraulic pressure supplied to the sixth port 320. A sixth land 332 is acted on by the hydraulic pressure supplied to the third port 314.

The third fail-safe valve 134 prevents the simultaneous operation of the third brake B3 and the fifth clutch C5. A valve body of the third fail-safe valve 134, with reference to FIG. 5, preferably includes at least four ports. A first port 340 receives part of the hydraulic pressure supplied to the third brake B3. A second port 342 receives hydraulic pressure from the third switching valve 126. A third port 344 receives D range pressure. A fourth port 346 supplies the hydraulic pressure supplied to the second port 342 to the fifth clutch C5.

A valve spool slidably provided within the valve body of the third fail-safe valve 134 preferably includes at least four lands. A first land 348 is acted on by the hydraulic pressure supplied to the first port 340. Second and third lands 350 and 352 supply the hydraulic pressure supplied to the second port 342 to the fourth port 346. A fourth land 354 is acted on by the hydraulic pressure supplied to the third port 344. The hydraulic pressure supplied to the third port 344 also acts at the same time on the third land 352.

AC1, AC2, AC3, AC4, AC5, and AC6 in FIG. 3 are accumulators that enable the stable supply of hydraulic pressure to the friction element to which they are connected.

The hydraulic control system of a preferred embodiment of the present invention is operated by a transmission control unit (TCU), which is not shown in the drawings. The TCU controls the first through sixth solenoid valves SOL1~SOL6 as shown in FIG. 6 to each of the friction elements (i.e., clutches and brakes) as shown in FIG. 2, thereby effecting shifting into the different speeds and ranges. The sixth solenoid valve SOL6, adapted for controlling hydraulic pressure supplied to the damper clutch of the torque converter 100, is obvious to a person ordinarily skilled in the art and accordingly further detailed description is omitted. Such a transmission control unit preferably includes a processor, memory and other associated hardware and software as may be selected by a person of ordinary skill in the art to execute the system control as described and taught herein.

Figure 7:
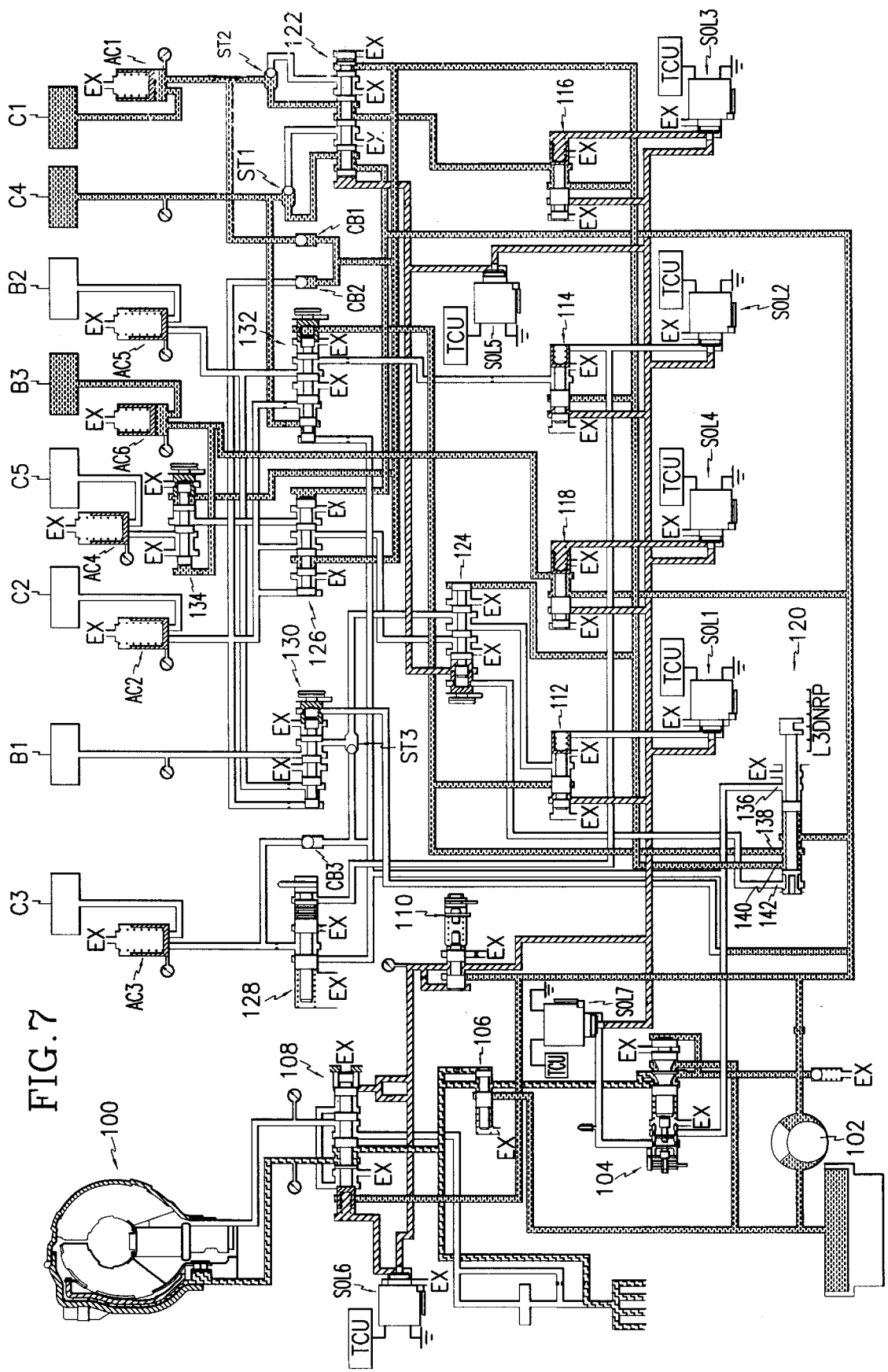
FIG. 7 is a hydraulic circuit diagram of the hydraulic control system of FIG. 3, illustrating the flow of hydraulic pressure in a first speed of a drive D range.

Operation of the hydraulic control system of the present invention will now be described. In the first speed of the drive D range, with reference to FIG. 7, D range pressure is controlled by the third pressure control valve 116, then passes through the first switching valve 122 to be supplied to the first clutch C1. Line pressure is supplied to the fourth clutch C4 through the first switching valve 122, and, simultaneously, to the third brake B3 through the fourth pressure control valve 118. Therefore, shifting into the first speed is realized.

Figure 8:
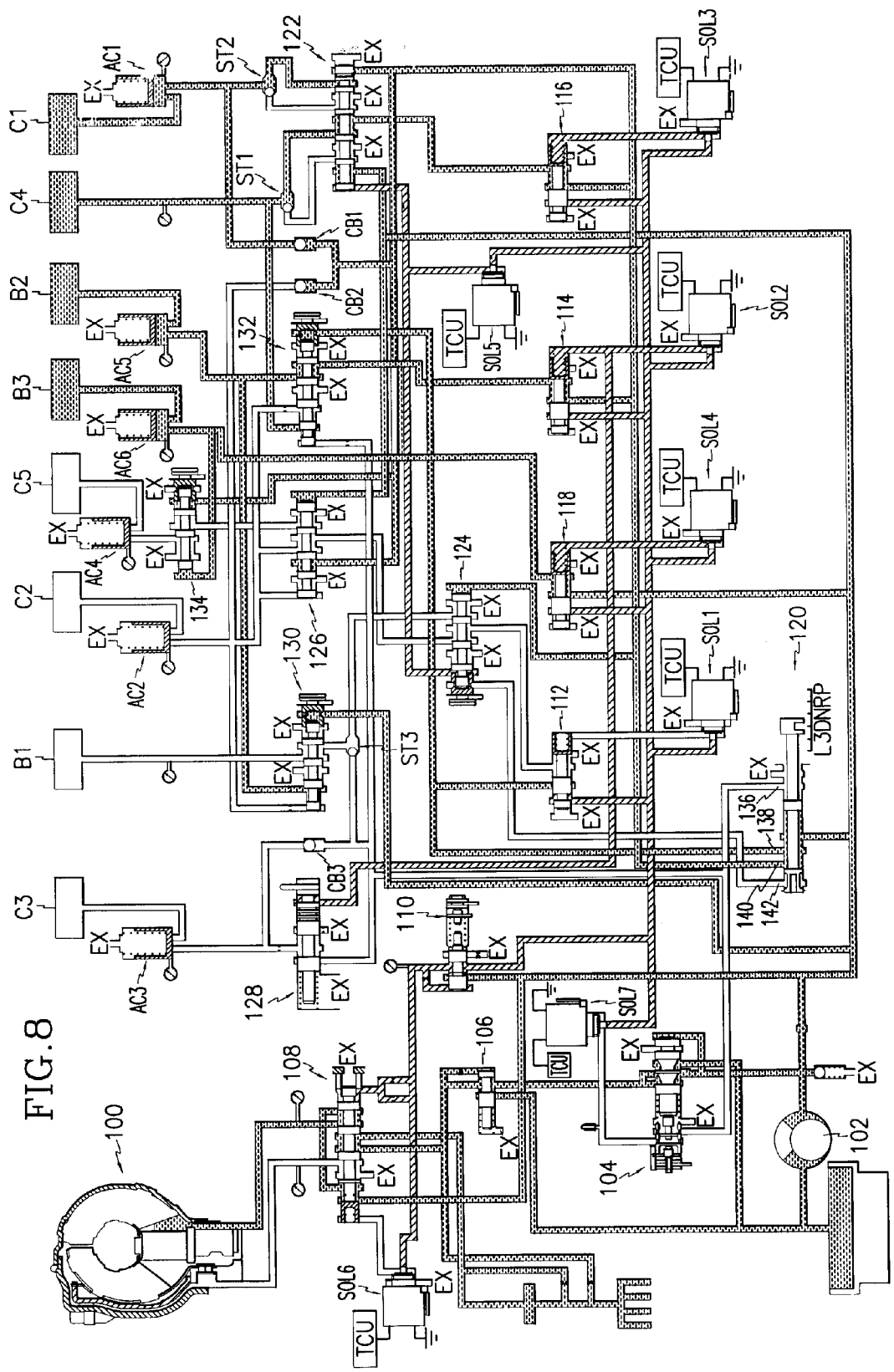
FIG. 8 is a hydraulic circuit diagram of the hydraulic control system of FIG. 3, illustrating the flow of hydraulic pressure in a second speed of a drive D range.

Hydraulic flow in the second speed of the drive D range will now be described with reference to FIG. 8. From the first speed state, the hydraulic pressure supplied to the first clutch C1 converts to D range pressure that does not pass through the third pressure control valve 116 as a result of port conversion of the first switching valve 122. The hydraulic pressure controlled in the third pressure control valve 116 is supplied to the fourth clutch C4. Further, part of the D range pressure is controlled by the second pressure control valve 114 to pass through the second fail-safe valve 132 and to be supplied to the second brake B2. Shifting into the second speed is realized as a result.

Figure 9:
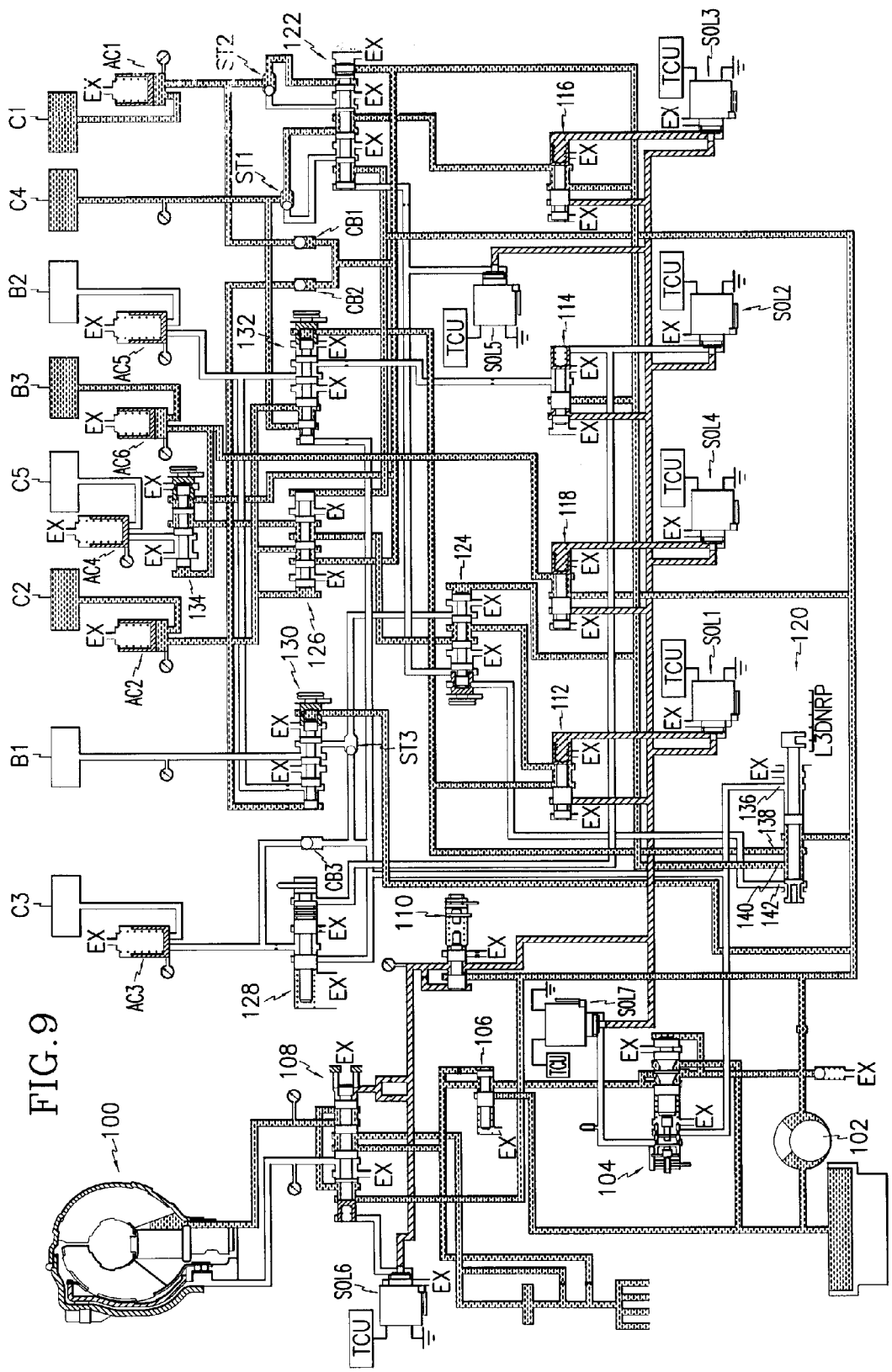
FIG. 9 is a hydraulic circuit diagram of the hydraulic control system of FIG. 3, illustrating the flow of hydraulic pressure in a third speed of a drive D range.

Hydraulic flow in the third speed of the drive D range will now be described with reference to FIG. 9. From the second speed state, the second brake B2 is disengaged while the second clutch C2 is engaged. At this time, the hydraulic pressure controlled by the first pressure control valve 112 is supplied through the second switching valve 124 and the third switching valve 126, which undergo port conversion by the D range pressure.

Figure 10:
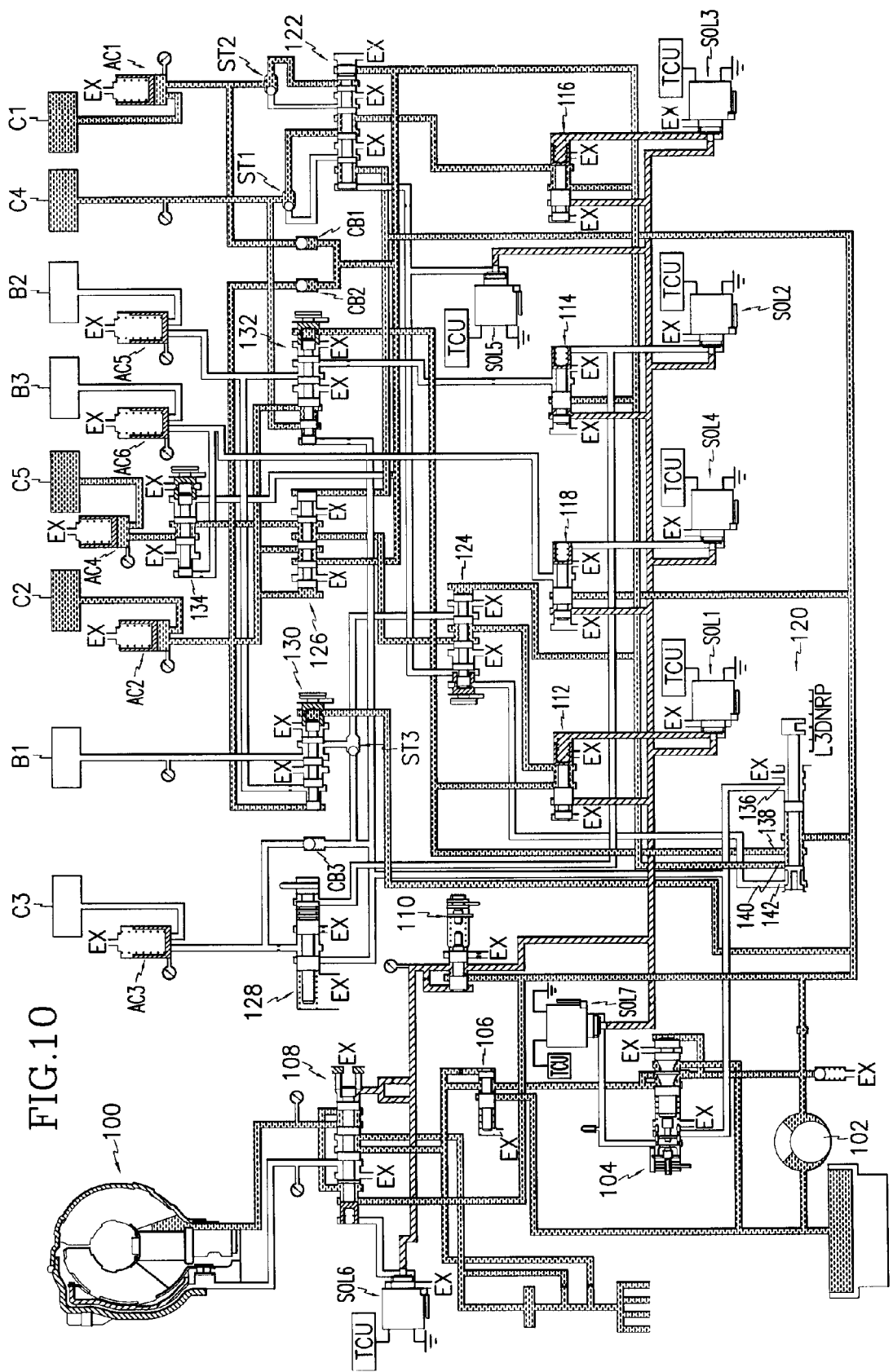
FIG. 10 is a hydraulic circuit diagram of the hydraulic control system of FIG. 3, illustrating the flow of hydraulic pressure in a fourth speed of a drive D range.

Hydraulic flow in the fourth speed of the drive D range will now be described with reference to FIG. 10. From the third speed state, the third brake B3 is disengaged while the fifth clutch C5 is engaged. The third brake B3 is disengaged by the port conversion of the fourth pressure control valve 118 resulting from the ON operation of the fourth solenoid valve SOL4, thereby causing the exhaust of the hydraulic pressure supplied to the third brake B3.

With respect to the engagement of the fifth clutch C5, third brake pressure is exhausted from the third fail-safe valve 134, which is controlled by operational pressure of the third brake B3, such that the third fail-safe valve 134 undergoes port conversion. As a result, hydraulic pressure supplied through the third switching valve 126 and in stand-by is supplied to the fifth clutch C5. Shifting into the fourth speed is realized as a result.

Figure 11:
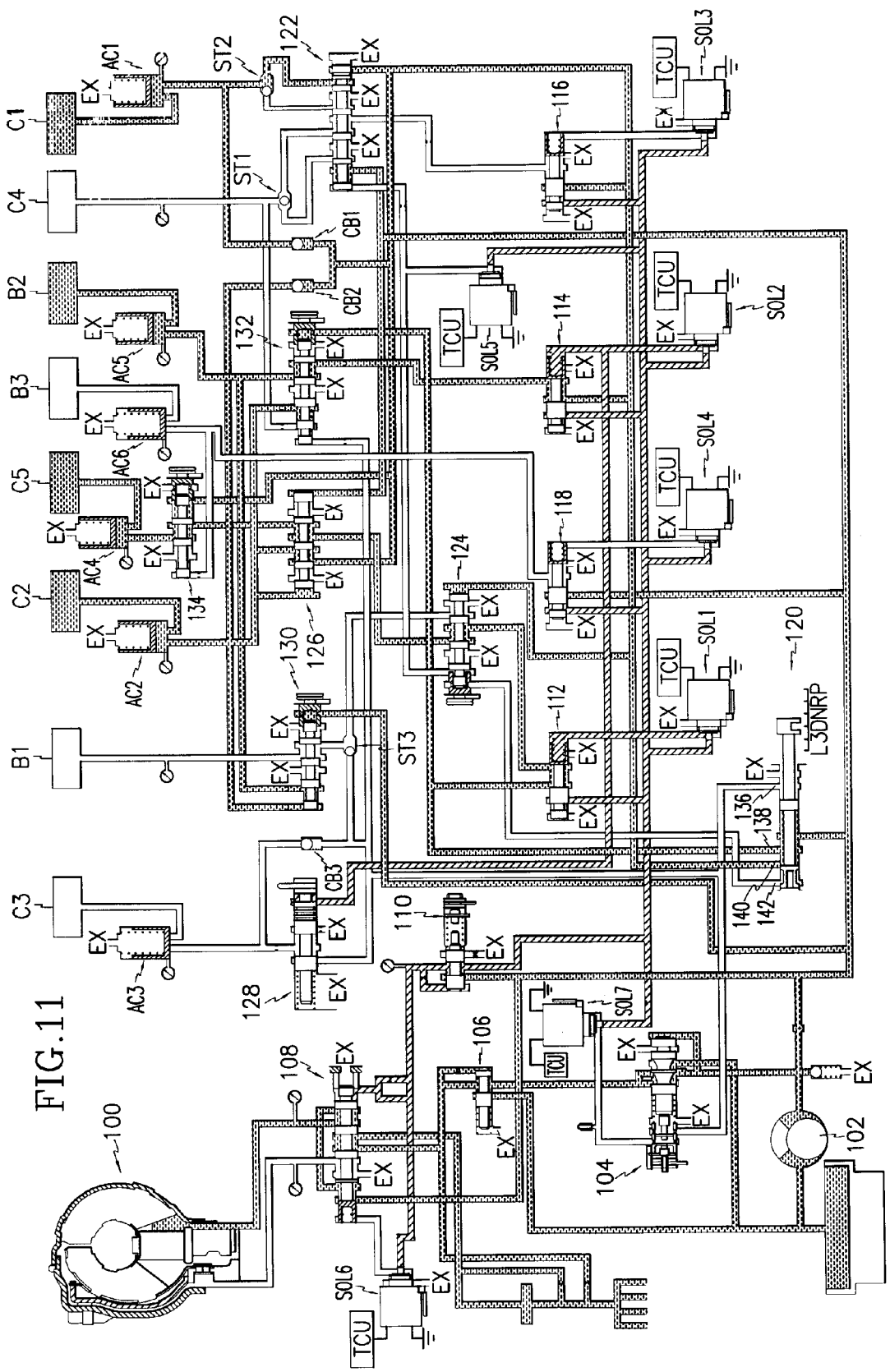
FIG. 11 is a hydraulic circuit diagram of the hydraulic control system of FIG. 3, illustrating the flow of hydraulic pressure in a fifth speed of a drive D range.

Hydraulic flow in the fifth speed of the drive D range will now be described with reference to FIG. 11. From the fourth speed state, the fourth clutch C4 is disengaged while the second brake B2 is engaged, thereby enabling shifting. The disengagement of the fourth clutch C4 is realized by the hydraulic pressure supplied to the fourth clutch C4 being cut off at the third pressure control valve 116 as a result of the ON operation of the third solenoid valve SOL3. Further, with respect to the engagement of the second brake B2, this is realized by the second solenoid valve SOL2 being controlled to OFF from an ON state, and D range pressure being supplied to the second brake B2 through the second fail-safe valve 132.

Figure 12:
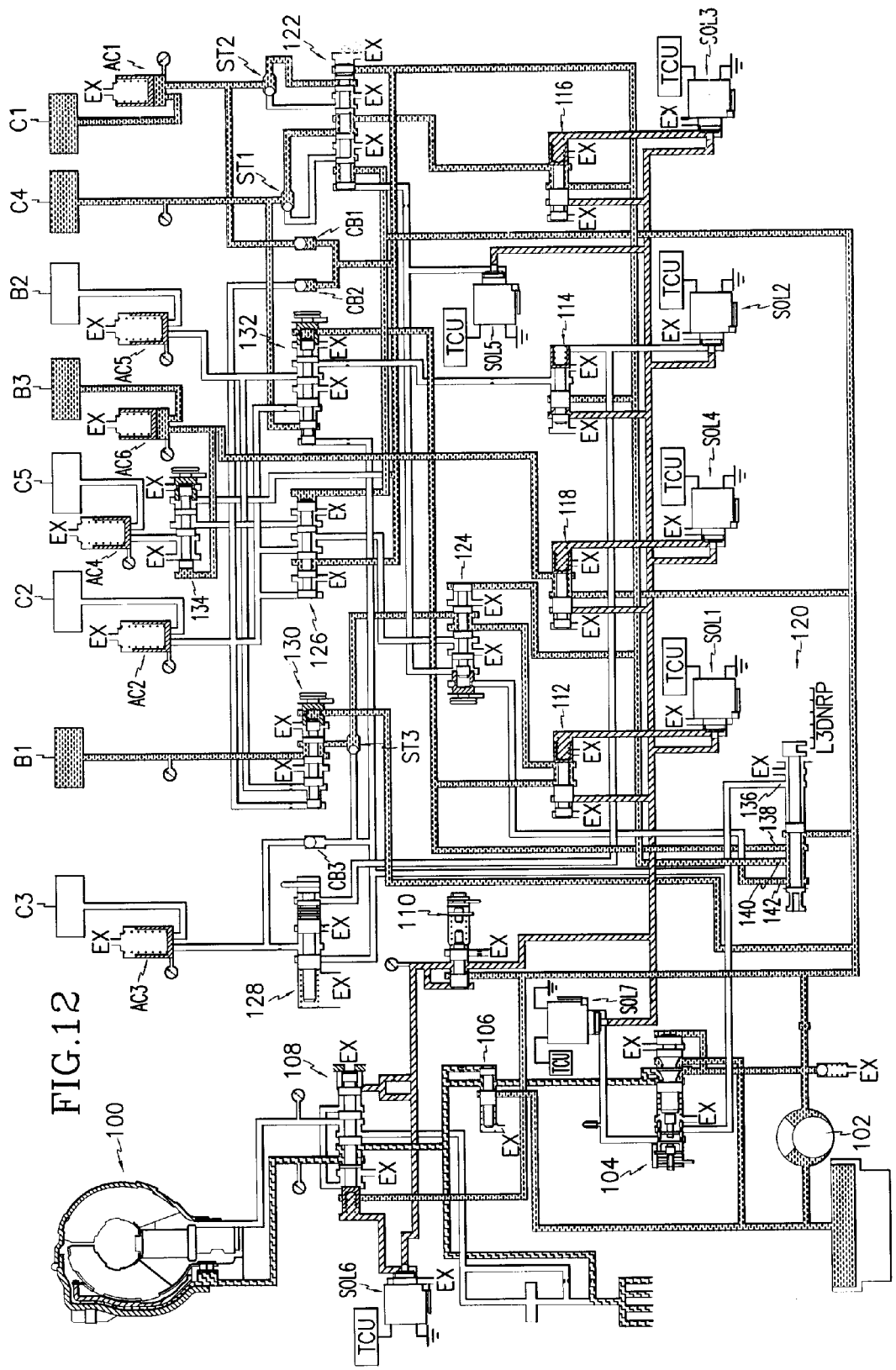
FIG. 12 is a hydraulic circuit diagram of the hydraulic control system of FIG. 3, illustrating the flow of hydraulic pressure in a low L range.

Hydraulic flow in the low L range will now be described with reference to FIG. 12. From the first speed state, the first brake B1 is additionally engaged such that engine braking occurs.

Figure 13:
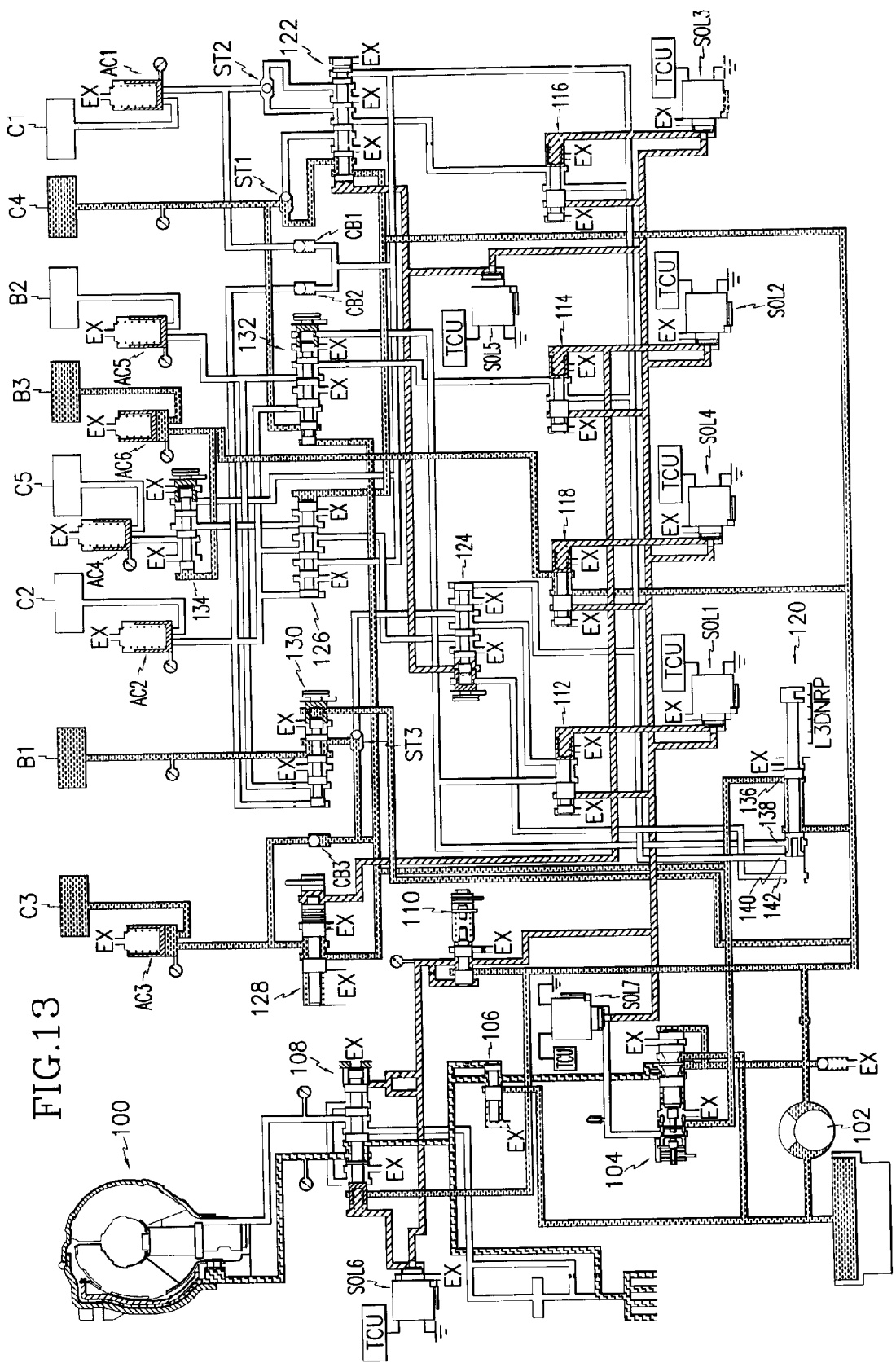
FIG. 13 is a hydraulic circuit diagram of the hydraulic control system of FIG. 3, illustrating the flow of hydraulic pressure in a reverse R range.

Hydraulic flow in the reverse R range will now be described with reference to FIG. 13. Shifting into the reverse R range is realized by the engagement of the third and fourth clutches C3 and C4, and of the first and third brakes B1 and B3. At this time, R range pressure supplied from the manual valve 120 is partially supplied to the N-R control valve 128 and to the first fail-safe valve 130, after which the pressure is supplied to the third clutch C3 and the first brake B1, respectively. Further, the third brake B3 receives line pressure by the OFF control of the fourth solenoid valve SOL4 to be engaged. Finally, if the first switching valve 122 undergoes port conversion by the OFF control of the fifth solenoid valve SOL5, line pressure is supplied to the fourth clutch C4 to engage the same.

Port conversion of the valves by the ON/OFF operation of the solenoid valves refers to the biasing of the valve spools-within the valves such that hydraulic pressure is re-directed. This will not be described in detail as such operation may clearly be ascertained from the drawings.

In the hydraulic control system of the present invention described above, a powertrain of a 5-speed automatic transmission is better controlled using five clutches and three brakes to thereby minimize fuel consumption and more efficiently utilize engine torque.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A hydraulic control system for automatic transmissions, comprising:

a manual valve indexed with a driver-operated shift selector;

a first pressure control valve controlled by a control pressure of a first solenoid valve, the first pressure control valve supplying N range pressure supplied from the manual valve selectively to a fifth clutch in fourth and fifth speeds, and to a first brake in a neutral N range and a low L range;

a second pressure control valve controlled by a control pressure of a second solenoid valve, the second pressure control valve supplying D range pressure supplied from the manual valve selectively to a second brake in a second speed and the fifth speed, and, simultaneously, as control pressure of a first fail-safe valve;

a third pressure control valve controlled by a control pressure of a third solenoid valve, the third pressure control valve supplying D range pressure supplied from the manual valve to a first clutch in a first speed, and to a fourth clutch in a low L range and in second, third, and fourth speeds;

a fourth pressure control valve controlled by a control pressure of a fourth solenoid valve, the fourth pressure control valve supplying line pressure as control pressure of a third brake and the third solenoid valve in first, second, and third speeds, and in a reverse R range and the neutral N range;

a first switching valve to selectively supply D range pressure, first pressure control valve pressure, and line pressure to the first clutch and to the fourth clutch, the fourth clutch operating in the first, second, third, and fourth speeds and in the reverse R and low L ranges;

a second switching valve controlled by L range pressure, D range pressure, and control pressure of a fifth solenoid valve, and undergoing port conversion to selectively supply hydraulic pressure supplied to the first pressure control valve to a second clutch and the first brake, which operate in the third, fourth, and fifth speeds;

a fifth solenoid valve for controlling a control pressure supplied from a reducing valve to selectively supply the pressure as control pressure to the first and second switching valves;

a third switching valve controlled by line pressure and second clutch pressure, and selectively supplying hydraulic pressure supplied from the second switching valve to the second clutch and the fifth clutch;

an N-R control valve controlled by control pressure of the second solenoid valve, and supplying R range pressure supplied from the manual valve to a third clutch in the reverse R range;

the first fail-safe valve controlled by line pressure, second brake pressure, and second clutch pressure, and selectively supplying hydraulic pressure supplied to the manual valve and the second switching valve to the first brake, the first fail-safe valve preventing the simultaneous engagement of the first and second brakes, and preventing forward driving by engagement of the first brake and the second clutch when in the neutral N range;

a second fail-safe valve controlled by R range pressure, second and fourth clutch pressure, and N range pressure, the second fail-safe valve preventing the simultaneous engagement of the second brake and the first, second, and fourth clutches, and selectively supplying hydraulic pressure supplied from the second pressure control valve to the second brake; and a third fail-safe valve controlled by D range pressure and third brake pressure, and selectively supplying hydraulic pressure supplied from the third switching valve to the fifth clutch, the third fail-safe valve preventing the simultaneous operation of the third brake and the fifth clutch.

2. The hydraulic control system of claim 1, wherein the first, second, third, fourth, and fifth solenoid valves are three-way valves, in which the supply of reduced hydraulic pressure is discontinued if the solenoid valves are controlled to ON, while if controlled to OFF, exhaust ports of the solenoid valves are closed.

3. The hydraulic control system of claim 1, wherein the first switching valve comprises:

a valve body including a first port for receiving control pressure from the fifth solenoid valve, a second port for receiving line pressure, a third port for receiving hydraulic pressure from the second pressure control valve, a fourth port for receiving D range pressure from the manual valve, a fifth port for supplying the hydraulic pressure supplied to the second port to the fourth clutch, a sixth port for supplying the hydraulic pressure supplied to the third port to the fourth clutch, a seventh port for supplying the hydraulic pressure supplied to the third port to the first clutch, and an eighth port for supplying the hydraulic pressure supplied to the fourth port to the first clutch; and a valve spool slidably provided within the valve body, the valve spool including a first land on which the hydraulic pressure supplied through the first port acts, a second land that selectively communicates the second port and the fifth port, a third land that selectively communicates the third port and the sixth port, a fourth land that selectively communicates the third port and the seventh port, a fifth land that selectively communicates the fourth port and the eighth port, and a sixth land on which the hydraulic pressure supplied through the fourth port acts.

4. The hydraulic control system of claim 3, wherein lines leading from the fifth and sixth ports of the first switching valve are converged at a first shuttle valve and connected to the fourth clutch, lines leading from the seventh and eighth ports of the first switching valve are converged at a second shuttle valve and connected to the first clutch, and the second shuttle valve is communicated with the fourth port through a bypass line, with a first check valve for preventing the reverse flow of hydraulic pressure being mounted on the bypass line.

5. The hydraulic control system of claim 1, wherein the second switching valve comprises:

a valve body including a first port connected to an L range pressure line, a second port connected to the first pressure control valve, a third port connected to a D range pressure line, a fourth port connected to the fifth solenoid valve, a fifth port connected to enable the supply of the hydraulic pressure supplied to the second port to the third switching valve, and a sixth port connected to enable the supply of hydraulic pressure supplied to the second port to the first brake through the first fail-safe valve; and a valve spool slidably provided within the valve body, the valve spool including a first land on which hydraulic pressure supplied to the first port acts, a second land on which hydraulic pressure supplied to the fourth port acts, a third land that selectively communicates the second port with the fifth port, a fourth land that selectively communicates the second port with the sixth port, and a fifth land on which hydraulic pressure supplied to the third port acts.

6. The hydraulic control system of claim 1, wherein the third switching valve comprises:

a valve body including a first port connected to enable the supply of line pressure, a second port connected to the second switching valve, a third port connected to a D range pressure line, a fourth port for supplying the hydraulic pressure supplied to the second port to the fifth clutch through a third fail-safe valve, a fifth port for selectively supplying the hydraulic pressure supplied to the second and third ports to the second clutch, and a sixth port connected to receive part of the hydraulic pressure supplied to the second clutch; and a valve spool slidably provided within the valve body, the valve spool including a first land on which the hydraulic pressure supplied to the first port acts, a second land for selectively communicating the second port with the fourth port, a third land for selectively communicating the second and third ports with the fifth port, a fourth land for selectively communicating the third port with the fifth port by acting in cooperation with the third land, and a fifth land on which the hydraulic pressure supplied through the sixth port acts.

7. The hydraulic control system of claim 6, wherein the fifth port is connected to the third port through a bypass line, and a second check valve is provided on the bypass line to prevent the reverse flow of hydraulic pressure.

8. The hydraulic control system of claim 1, wherein the N-R control valve comprises:

a valve body including a first port connected to the fifth solenoid valve, a second port for receiving R range pressure, and a third port for supplying hydraulic pressure supplied to the second port to the third clutch;

a valve spool slidably provided within the valve body, the valve spool including a first land on which the hydraulic pressure supplied to the first port acts, and a second land for selectively opening and closing the second port; and an elastic member interposed between the second land and the valve body.

9. The hydraulic control system of claim 8, wherein the third port is communicated with the second port through a bypass line, and a third check valve is provided on the bypass line to prevent the reverse flow of hydraulic pressure.

10. The hydraulic control system of claim 1, wherein the first fail-safe valve comprises:

a valve body including a first port for receiving line pressure, a second port for receiving one of pressure from the second switching valve and R range pressure, a third port for receiving control pressure from the second switching valve, a fourth port for receiving part of the hydraulic pressure supplied to the second brake, and a fifth port for supplying the hydraulic pressured supplied to the second port to the first brake; and a valve spool provided within the valve body, the valve spool including a first land on which the hydraulic pressure supplied to the first port acts, second and third lands for selectively communicating the second port and the fifth port, a fourth land on which the hydraulic pressure supplied to the fourth port acts, and a fifth land on which the hydraulic pressure supplied to the third port acts.

11. The hydraulic control system of claim 10, wherein a third shuttle valve is provided on a line connected to the second port such that the first fail-safe valve selectively receives hydraulic pressure from the second switching valve and an R range pressure line.

12. The hydraulic control system of claim 1, wherein the second fail-safe valve comprises:
a valve body including a first port for receiving line pressure, a second port for receiving hydraulic pressure from the second pressure control valve, a third port for receiving R range pressure, a fourth port for supplying the hydraulic pressure supplied to the second port to the second brake, a fifth port for receiving part of the hydraulic pressure supplied to the second clutch, and a sixth port for receiving the hydraulic pressure supplied to the fourth clutch; and
a valve spool slidably provided within the valve body, the valve spool including a first land on which the hydraulic pressure supplied to the first port acts, second and third lands for selectively supplying the hydraulic pressure supplied to the second port to the fourth port, a fourth land on which the hydraulic pressure supplied to the fifth port acts, a fifth land on which the hydraulic pressure supplied to the sixth port acts, and a sixth land on which the hydraulic pressure supplied to the third port acts.

13. The hydraulic control system of claim 1, wherein the third fail-safe valve comprises:
a valve body including a first port for receiving part of the hydraulic pressure supplied to the third brake, a second port for receiving hydraulic pressure from the third switching valve, a third port for receiving D range pressure, and a fourth port for supplying the hydraulic pressure supplied to the second port to the fifth clutch; and
a valve spool slidably provided within the valve body, the valve spool including a first land on which the hydraulic pressure supplied to the first port acts, second and third lands for supplying the hydraulic pressure supplied to the second port to the fourth port, and a fourth land on which the hydraulic pressure supplied to the third port acts, the hydraulic pressure supplied to the third port acting at the same time also on the third land.

14. The hydraulic control system of claim 1, wherein an accumulator is provided for each of the first, second, and third clutches, and the second and third brakes.

15. A hydraulic control system for a five speed automatic transmission having five drive range speeds, a reverse range and a neutral range, wherein said transmission includes a plurality of clutches and brakes, said control system comprising:
a manual valve indexed with a driver-operated shift selector;
a first pressure control valve supplying neutral range pressure supplied from the manual valve selectively to a clutch in the fourth and fifth speeds, and to a brake in the neutral N range and the low L range;
a second pressure control valve supplying D range pressure supplied from the manual valve selectively to another brake in a second speed and the fifth speed, and, simultaneously, as control pressure of a first fail-safe valve;
a third pressure control valve supplying D range pressure supplied from the manual valve to another clutch in a first speed, and to a different clutch in a low L range and in second, third, and fourth speeds;
a fourth pressure control valve supplying line pressure as control pressure of a brake in first, second, and third speeds, and in the reverse R range and the neutral N range;
a first switching valve selectively supplying D range pressure and line pressure to two clutches, at least one clutch being operated in the first, second, third, and fourth speeds and in the reverse R and low L ranges;
a second switching valve selectively supplying hydraulic pressure supplied to the first pressure control valve to a clutch and a brake operable in the third, fourth, and fifth speeds;
a fifth solenoid valve for controlling a control pressure supplied from a reducing valve to selectively supply the pressure as control pressure to the first and second switching valves;
a third switching valve selectively supplying hydraulic pressure supplied from the second switching valve to a second clutch and a fifth clutch; and
an N-R control valve supplying R range pressure supplied from the manual valve to a clutch in the reverse R range.

16. The control system of claim 13, wherein the first fail-safe valve prevents simultaneous engagement of first and second brakes, and preventing forward driving by engagement of the first brake and a clutch when in the neutral N range, and wherein said system further comprises:
a second fail-safe preventing simultaneous engagement of the second brake and first, second, and fourth clutches; and
a third fail-safe valve preventing simultaneous operation of a third brake and a fifth clutch.

17. A hydraulic control system for a five speed automatic transmission having five drive range speeds, a reverse range and a neutral range, wherein said transmission includes a plurality of friction elements, said plurality of friction elements including at least one friction element operated only at the drive range speeds and at least one friction element operated only at the reverse range, said control system comprising:
a manual valve indexed with a driver-operated shift selector, said manual valve selectively outputting D range pressure or R range pressure; and
a hydraulic pressure distributing unit supplying only said D range pressure selectively to said at least one friction element operated only at the drive range speeds, and supplying only said R range pressure selectively to said at least one friction element operated only at the reverse range, wherein
said plurality of friction elements includes a first clutch and a first brake, both of which are connected to a same operating element of the transmission, the operating element being one of a ring gear, a carrier, and a sun gear;
the hydraulic pressure distributing unit comprises a switch valve for selectively supplying hydraulic pressure to the first clutch and the first brake such that simultaneous operation of the first clutch and first brake is prevented; and a hydraulic pressure supply line for supplying hydraulic pressure to the first clutch a hydraulic pressure supply line for supplying hydraulic pressure to the first brake meet at the switch valve.

18. The hydraulic control system of claim 17, wherein:

the transmission includes a primary and secondary shift assembly, said primary shift assembly including the first brake, a second brake, the first clutch, and a second clutch; and the hydraulic pressure distributing unit comprises:
  a first fail-safe valve preventing simultaneous hydraulic pressure supply to the first and second brakes; and
  a second fail-safe valve preventing simultaneous hydraulic pressure supply to the second brake and the second clutch.

19. The hydraulic control system of claim 18, wherein:

the secondary shift assembly includes a third brake and a third clutch; and the hydraulic pressure distributing unit further comprises a third fail-safe valve for preventing simultaneous hydraulic pressure supply to the third brake and the third clutch.

* * * * *